Oct. 27, 1925.
P. KREISEL
1,558,895
INDICATING MEMBER
Filed May 12, 1923
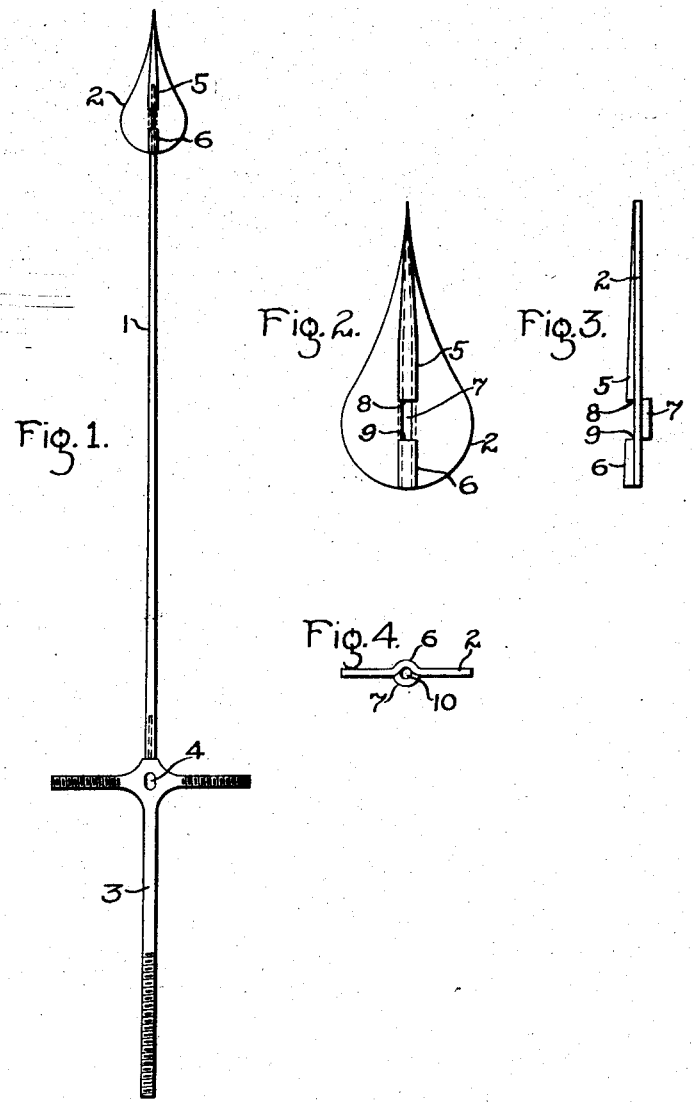
WITNESSES:
R. J. Butler
F. H. Miller
INVENTOR
Paul Kreisel.
BY
ATTORNEY Patented Oct. 27, 1925.

1,558,895

UNITED STATES PATENT OFFICE.

PAUL KREISEL, OF NEWARK, NEW JERSEY, ASSIGNOR TO WESTINGHOUSE ELECTRIC & MANUFACTURING COMPANY, A CORPORATION OF PENNSYLVANIA.

INDICATING MEMBER.

Application filed May 12, 1923. Serial No. 638,622.

*To all whom it may concern:*

Be it known that I, PAUL KREISEL, a citizen of Germany, and a resident of Newark, in the county of Essex and State of New Jersey, have invented a new and useful Improvement in Indicating Members, of which the following is a specification.

My invention relates to indicating members and particularly to means for mounting target members on the ends of measuring-instrument pointers.

One object of my invention is to provide a device of the above indicated character that shall be simple and durable in construction, economical to manufacture and effective in its operation.

Another object of my invention is to provide a measuring instrument pointer and its target that shall be held together by their co-operative relation, independently of any other medium.

Another object of my invention is to provide separate target pointer members that may be easily assembled and effectively held in permanent operative relation.

Heretofore, it has been usual to construct instrument pointers from flat sheet material having target portions integral therewith. It has also been usual to cement or solder separate target members on the ends of the pointers. However, the pointer of the first mentioned type is not suited to all classes of instruments and the pointer of the latter type is more or less expensive and inconvenient to assemble.

To facilitate the assembly and to economize the construction of instrument pointers, I propose to employ members that may be readily assembled and, by a simple pressing action, may be effectively connected together.

The device is particularly adapted for mounting on a novel type of pointer fully set forth in co-pending application, Serial No. 615,866; filed Jan. 30, 1923, by P. MacGahan and assigned to the Westinghouse Electric & Manufacturing Company.

Figure 1 of the accompanying drawings is an assembled view of an indicating member or structure, for a measuring instrument, comprising a pointer arm and a target member therefor, constructed and assembled in accordance with my invention, Figure 2 is an enlarged detail plan or elevational view of the target member of Fig. 1, Fig. 3 is a side elevational view of a target member taken at right angles to Fig. 2, and Fig. 4 is a bottom plan view of the target member shown in Fig. 2.

The device comprises, in general, an instrument pointer or arm 1, a target member 2 for the outer end thereof, and a base or balance structure 3, for the inner end of the pointer 1, having an opening 4 therein for mounting the device on an instrument shaft (not shown).

As set forth in the above mentioned co-pending application, the pointer is preferably of tapered seamless tubular construction. This construction provides great strength and resistance against bending for a given weight.

The target member 2, preferably constructed of sheet aluminum or other suitable light weight material, is formed, by a simple punching process, to have raised portions 5 and 6 on one side thereof and a depressed portion 7 intermediate the portions 5 and 6. The portions 5, 6 and 7 are of substantially U-shape in cross-section having an opening 8 between the portions 5 and 7 and an opening 9 between the portions 7 and 6. Since the portion 7 projects oppositely to the portions 5 and 6, a socket or opening 10 is provided for the reception of the outer end of the pointer 1. The raised portion 5 tapers to substantially the outer end of the target member 2 to reinforce the latter and to prevent bending of the relatively delicate outer end thereof.

In assembling the device, the pointer member 1 is placed in the socket 10, by inserting it through the openings 9 and 8, and the device thereafter subjected to pressure normal to the plane of the target member 2. This operation moves the portion 6 and the inner end of the portion 5 inwardly on one side of the member 2 and moves the portion 7 inwardly from the other side of the member 2 to effect a slight bend in that portion of the pointer between the portions 5 and 6 of the target member. Thus, the target 2 and the pointer 1 are interlocked to prevent longitudinal withdrawal of the target member and, since they are pressed together in the plane of the target member, are provided with flattened engaging surfaces in that plane to prevent relative turning. This construction retains the target member in proper position.

By my invention, a very simple indicating member is provided in which the members thereof are prevented from separation and relative displacement, without the aid of any other medium or element, such as cement and rivets. Further, a relatively thin target disk, which is thereby light in weight, is reinforced against bending at its indicating point.

All of the above described features combine to render the device economical, durable and effective to a high degree.

While I have shown and described a particular form of my invention, changes may be effected therein without departing from the spirit and scope thereof, as set forth in the appended claims.

I claim as my invention:

1. An indicating device comprising a pointer member and a target member embodying longitudinally-extending side-by-side related sections held against lateral separation and adapted to provide a transversely-extending portion on each of said members for co-operation with the transversely-extending portion on the other to positively interlock the members against longitudinal relative movement.

2. An indicating device comprising a pointer member and a target member one of which has adjacent longitudinal sections on opposite sides of the other and one of which has an opening between the adjacent ends of said sections through which a portion of the other member extends, said portion and sections being adapted to provide co-operating transversely-extending portions to positively interlock the members against longitudinal relative movement.

3. An indicating device comprising a pointer and a sheet-material target embodying longitudinally-alined, alternately raised and depressed portions having end openings and co-operating to constitute substantially a receiving socket for the pointer.

4. An indicating device for a measuring instrument comprising a flat sheet-metal target having longitudinally aligned spaced raised portions of substantially U-shape in cross-section on one side thereof and a depressed portion of similar cross-section extending longitudinally between said portions to therewith constitute a socket, and a pointer having an end portion for insertion in said socket, the arrangement of parts operating when pressure is applied normal to the flat surface of the target, to bend the pointer between said raised portions to hold the target and pointer together.

5. An indicating device for a measuring instrument comprising a flat sheet-metal target having longitudinally taper aligned spaced raised portions of substantially U-shape in cross-section on one side thereof and a longitudinally tapered depressed portion of similar cross-section extending longitudinally between said portions to therewith constitute a tapered socket, and a pointer having a tapered end portion for longitudinal wedging insertion in said socket, the arrangement of parts operating, when pressure is applied normal to the flat surface of the target, to bend the pointer between said raised portions to hold the target and pointer together and to prevent relative turning thereof.

6. An indicating device comprising a pointer and a sheet-material target member having a pointed indicating end and a reinforcing channel portion extending inwardly from a position adjacent to said end along the longitudinal axis thereof and terminating in a receiving portion for said pointer.

7. An indicating device comprising a pointer and a sheet-material target member having a pointed indicating end and an integral reinforcing portion extending inwardly from a position adjacent to said end along the longitudinal axis thereof, the inner portion of said reinforcing portion constituting receiving means for said pointer.

In testimony whereof, I have hereunto subscribed my name this seventh day of May, 1923.

PAUL KREISEL. [L. S.]